(12) United States Patent
Kim

(10) Patent No.: US 11,637,472 B2
(45) Date of Patent: Apr. 25, 2023

(54) MOTOR

(71) Applicant: LG INNOTEK CO., LTD., Seoul (KR)

(72) Inventor: Jin Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 286 days.

(21) Appl. No.: 17/255,758

(22) PCT Filed: Jul. 9, 2019

(86) PCT No.: PCT/KR2019/008415
§ 371 (c)(1),
(2) Date: Dec. 23, 2020

(87) PCT Pub. No.: WO2020/013568
PCT Pub. Date: Jan. 16, 2020

(65) Prior Publication Data
US 2021/0273519 A1 Sep. 2, 2021

(30) Foreign Application Priority Data

Jul. 11, 2018 (KR) .......................... 10-2018-0080728

(51) Int. Cl.
*H02K 7/08* (2006.01)
*H02K 5/173* (2006.01)
(Continued)

(52) U.S. Cl.
CPC ............ *H02K 5/1732* (2013.01); *F16B 39/28* (2013.01); *F16C 35/04* (2013.01); *H02K 7/083* (2013.01)

(58) Field of Classification Search
CPC ...... H02K 5/1732; H02K 7/083; F16B 39/28; F16C 35/04
(Continued)

(56) References Cited

U.S. PATENT DOCUMENTS

| 3,915,523 A | 10/1975 | Shank |
| 2010/0143031 A1 | 6/2010 | Chamberlin et al. |
| 2017/0110933 A1 | 4/2017 | Michel |

FOREIGN PATENT DOCUMENTS

| CN | 204664120 U | 9/2015 |
| CN | 105757129 A | 7/2016 |

(Continued)

OTHER PUBLICATIONS

International Search Report in International Application No. PCT/KR2019/008415, filed Jul. 9, 2019.
(Continued)

*Primary Examiner* — Terrance L Kenerly
(74) *Attorney, Agent, or Firm* — Saliwanchik, Lloyd & Eisenschenk

(57) ABSTRACT

The present invention may provide a motor including a housing, a cover which covers the housing, a stator disposed inside the housing, a rotor disposed inside the stator, a rotary shaft coupled to the rotor, a bearing disposed on the cover, and a nut which is coupled to the cover and which is in contact with an outer ring of the bearing, wherein the cover incudes a first pocket accommodating the bearing and a second pocket which is disposed above the first pocket and to which the nut is rotation-coupled, the nut includes a body disposed to be lower than an upper surface of the cover and including a screw thread and an extension portion disposed to be higher than the upper surface of the cover, the body incudes a protrusion protruding outward from the screw thread, and the second pocket includes a first groove in which the protrusion is positioned.

7 Claims, 9 Drawing Sheets

(51) Int. Cl.
*F16B 39/28* (2006.01)
*F16C 35/04* (2006.01)

(58) Field of Classification Search
USPC .......................................................... 310/90
See application file for complete search history.

(56) References Cited

FOREIGN PATENT DOCUMENTS

| | | |
|---|---|---|
| DE | 10 2006 029 221 A1 | 12/2007 |
| KR | 1987-0001520 Y1 | 4/1987 |
| KR | 20-0421128 Y1 | 7/2006 |
| KR | 10-2017-0069469 A | 6/2017 |

OTHER PUBLICATIONS

Office Action dated Jan. 17, 2022 in Chinese Application No. 201980046519.4.
Supplementary European Search Report dated Aug. 6, 2021 in European Application No. 19834835.1.

FIG. 7

| NO. | ROOM TEMPERATURE 20 °C | | | HIGH TEMPERATURE 100 °C | | |
|---|---|---|---|---|---|---|
| | Spec (Nm) | COMPARATIVE EXAMPLE (Nm) | EXAMPLE (Nm) | Spec (Nm) | COMPARATIVE EXAMPLE (Nm) | EXAMPLE (Nm) |
| 1 | MIN. 60Nm 20°C | 65 | 93 | MIN. 50Nm 100°C × 4Hr | 53 | 66 |
| 2 | | 68 | 91 | | 58 | 67 |
| 3 | | 70 | 90 | | 55 | 69 |
| 4 | | 64 | 97 | | 58 | 61 |
| 5 | | 65 | 93 | | 62 | 61 |
| 6 | | 73 | 90 | | 55 | 66 |
| 7 | | 69 | 99 | | 56 | 65 |

MOTOR

CROSS-REFERENCE TO RELATED APPLICATIONS

This application is the U.S. national stage application of International Patent Application No. PCT/KR2019/008415, filed Jul. 9, 2019, which claims the benefit under 35 U.S.C. § 119 of Korean Application No. 10-2018-0080728, filed Jul. 11, 2018, the disclosures of each of which are incorporated herein by reference in their entirety.

TECHNICAL FIELD

The present invention relates to a motor.

BACKGROUND ART

A motor includes a rotary shaft, a rotor, and a stator. The rotor and the stator are accommodated in a housing. The housing has a form whose upper portion is open. A cover covers the open upper portion of the housing. The bearing rotatably supports the rotary shaft. The bearing is positioned in a pocket of the cover. In this case, a nut fixing the bearing is disposed in the pocket. The nut is rotation-coupled to the pocket to restrict the bearing so that the bearing does not escape from the pocket.

The cover is caulked to fix the nut so that the nut is not loosened in the pocket. However, the motor having such a structure has a problem in that a foreign material is generated in a process in which the cover is caulked. Particularly, in the case in which the cover is caulked, since a caulked portion is in contact with only an upper surface of the bearing, there is a problem in that a loosening torque is low and thus the nut is easily loosened.

Technical Problem

The present invention is directed to providing a motor allowing generation of a foreign material to be reduced during caulking and a loosening torque to be increased.

Technical Solution

One aspect of the present invention provides a motor including a housing, a cover which covers the housing, a stator disposed inside the housing, a rotor disposed inside the stator, a rotary shaft coupled to the rotor, a bearing disposed on the cover, and a nut which is coupled to the cover and which is in contact with an outer ring of the bearing, wherein the cover incudes a first pocket accommodating the bearing and a second pocket which is disposed above the first pocket and to which the nut is rotation-coupled, the nut includes a body disposed to be lower than an upper surface of the cover and including a screw thread and an extension portion disposed to be higher than the upper surface of the cover, the body incudes a protrusion protruding outward from the screw thread, and the second pocket includes a first groove in which the protrusion is positioned.

The extension portion may include a second groove, the cover may include a third groove connected to the second groove, the second groove may be concavely disposed at a boundary between an upper surface of the extension portion and an outer side surface of the extension portion, and the third groove may be concavely disposed in the upper surface of the cover.

A bottom surface of the second groove and a bottom surface of the third groove may be disposed to be aligned at the same height.

A planar shape formed by the second groove and the third groove may be symmetrical with respect to a reference line passing through a center of the cover in a radial direction.

The protrusion may be disposed under a bottom surface of the third groove disposed above the screw thread of the body.

A lower surface and an outer side surface of the outer ring of the bearing may be in contact with an inner wall of the first pocket, and a lower surface of the nut may be in contact with an upper surface of the outer ring of the bearing.

The second groove and the third groove may be disposed as a plurality of second grooves and a plurality of third grooves, respectively, and the plurality of the second grooves and the third grooves may be disposed to be rotationally symmetrical with respect to a center of the cover.

Advantageous Effects

According to embodiments, an advantageous effect of securing assemblability of a magnet even without a bridge of a core of a rotor is provided.

DESCRIPTION OF DRAWINGS

FIG. 7 is a table showing the comparison between a loosening torque of a comparative example and a loosening torque of an example of the embodiment.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted in a sense generally understandable to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first,". "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element by still another element disposed therebetween.

In a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
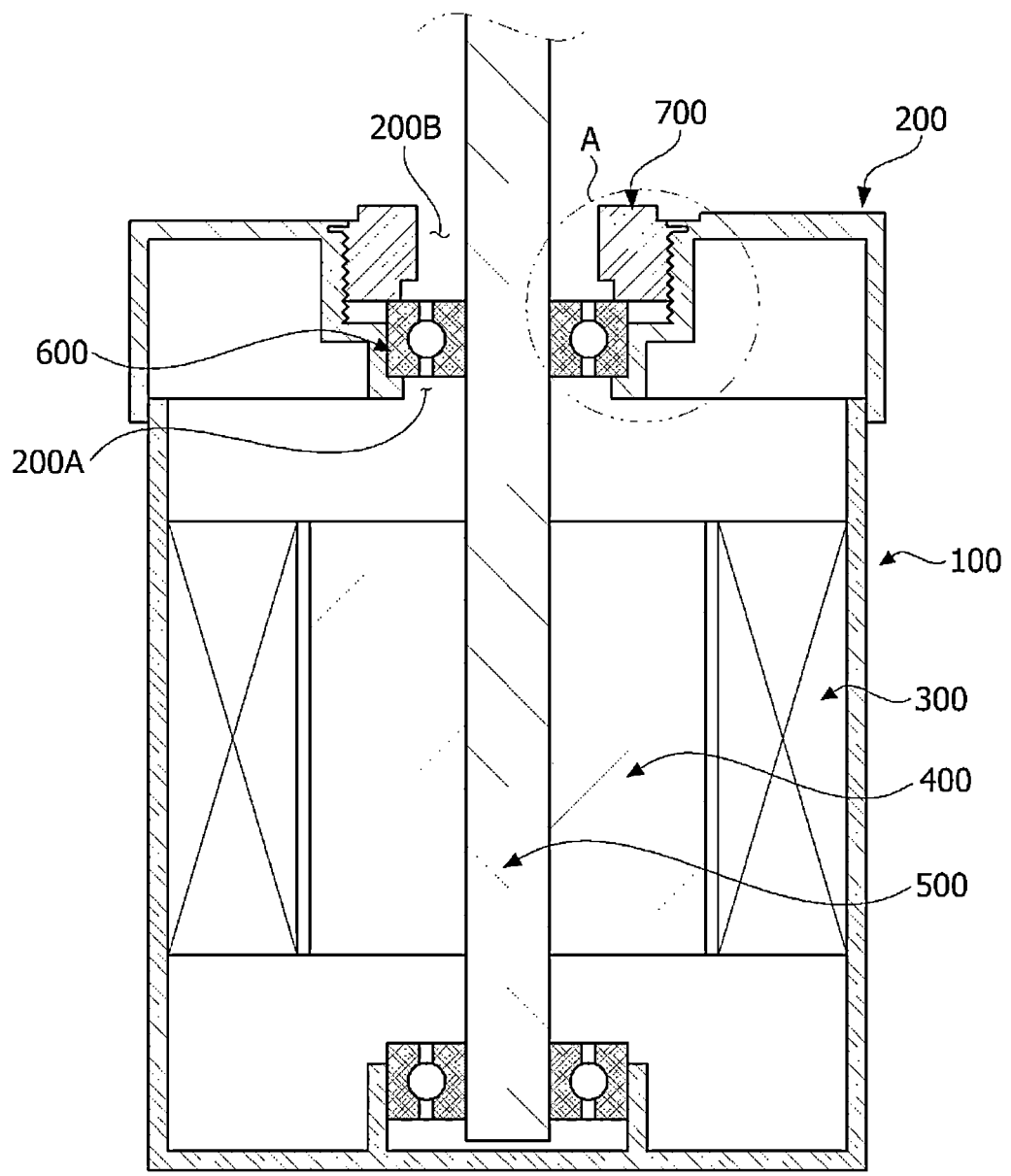
FIG. 1 is a cross-sectional view illustrating a motor according to an embodiment.
Figure 2:
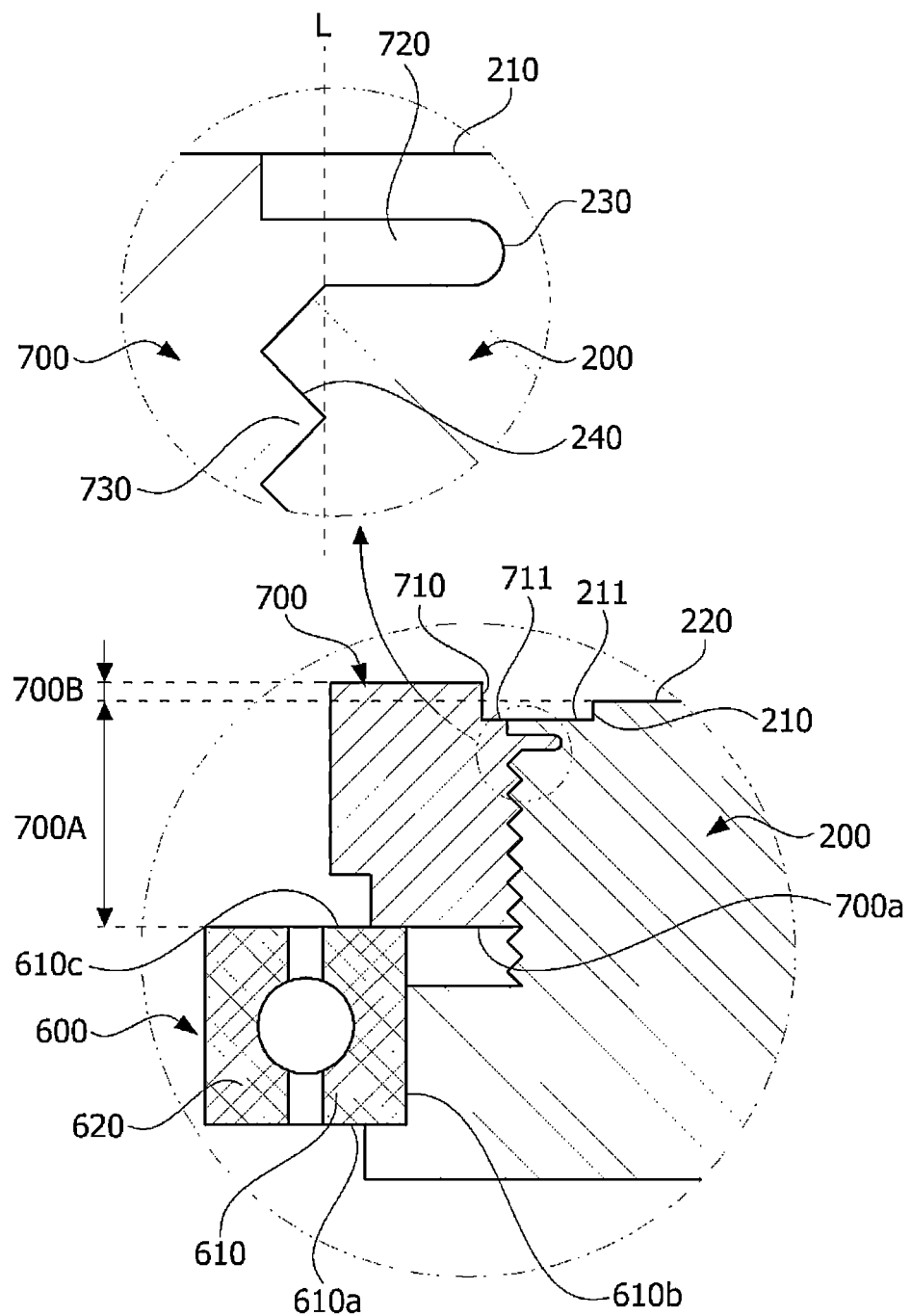
FIG. 2 is an enlarged view illustrating a region A of FIG. 1.

FIG. 1 is a cross-sectional view illustrating a motor according to an embodiment, and FIG. 2 is an enlarged view illustrating a region A of FIG. 1.

Referring to FIGS. 1 and 2, the motor according to the embodiment may include a housing 100, a cover 200, a stator 300, a rotor 400, a rotary shaft 500, a bearing 600, and a nut 700.

The housing 100 accommodates the rotor 400 and the stator 300 therein. The housing 100 may have a cylindrical shape whose upper portion is open.

The cover 200 is coupled to the housing 100. The cover 200 covers the open upper portion of the housing 100. The cover 200 includes a first pocket 200A and a second pocket 200B. Both of the first pocket 200A and the second pocket 200B may be disposed at a central portion of the cover 200. The first pocket 200A accommodates the bearing 600. In addition, the second pocket 200B accommodates the nut 700. An inner wall of the first pocket 200A is in contact with an outer side surface 610b of an outer ring 610 of the bearing 600. In addition, the inner wall of the first pocket 200A may be in contact with a lower surface 610a of the outer ring 610 of the bearing 600. The inner wall of the first pocket 200A supports the bearing 600 in radius and axis directions of the motor. The second pocket 200B is disposed above the first pocket 200A. An inner diameter of the second pocket 200B may be greater than an inner diameter of the first pocket 200A. Screw grooves 240 may be formed in an inner side surface of the second pocket 200B. The nut 700 is rotation-coupled to the second pocket 200B. A lower surface 700a of the nut 700 coupled to the second pocket 200B is in contact with and presses an upper surface 610c of the outer ring 610 of the bearing 600. In this case, a portion of the bearing 600 may protrude from the first pocket 200A to be positioned in the second pocket 200B. This is for a contact between the bearing 600 and the nut 700.

The stator 300 is disposed outside the rotor 400. A coil may be wound around the stator 300. This is to induce an electrical interaction with the rotor 400. An exemplary structure of the stator 300 will be described below. The stator 300 may include a core of the stator 300, wherein the core includes a plurality of teeth. An annular yoke portion and the teeth around which the coil is wound from a yoke toward a center thereof may be provided in the core of the stator 300. The teeth may be provided along an outer circumferential surface of the yoke portion at predetermined intervals. Meanwhile, the core of the stator 300 may be provided as a plurality of thin steel plates which are stacked. In addition, the core of the stator 300 may be provided as a plurality of divided cores which are coupled or connected.

The rotor 400 is disposed inside the stator 300. In addition, the rotor 400 is coupled to the rotary shaft 500. The rotor 400 rotates due to the electrical interaction with the stator 300. The rotor 400 may include a mold member, cores, and a magnet. The mold member is disposed outside the rotary shaft. The core is disposed outside the mold member. The magnet is disposed between the cores. The core may be formed in a form in which a plurality of circular thin steel plates are stacked or one barrel form.

The rotary shaft 500 may be coupled to the rotor 400. When a current is supplied to the rotor 400 and the stator 300 to induce the electromagnetic interaction therebetween, the rotor 400 is rotated, and the rotary shaft 500 is rotated in conjunction with the rotor 400.

The bearing 600 rotatably supports the rotary shaft. The bearing 600 is accommodated in the first pocket 200A of the cover 200.

The nut 700 is accommodated in the second pocket 200B of the cover 200 of the bearing 600. The nut 700 presses the bearing 600 from above the bearing 600 to fix the bearing 600 to the cover 200. The nut 700 is an annular member. The rotary shaft 500 passes through a central portion of the nut 700. In addition, screw threads 730 are formed on an outer circumferential surface of the nut 700.

Referring to FIG. 2, the nut 700 may be divided into a body 700A and an extension portion 700B. In a portion of the nut 700, the body 700A corresponds to a portion which is lower than an upper surface 220 of the cover 200, and the extension portion 700B corresponds to a portion which is higher than the upper surface 220 of the cover 200 when the nut 700 is rotation-coupled to the second pocket 200B and the lower surface of the nut 700 comes into contact with the upper surface 610c of the outer ring 610 of the bearing 600. The body 700A includes the screw threads 730 and is rotation-coupled to the second pocket 200B.

The body 700A includes a protrusion 720. The protrusion 720 has a form protruding outward from the screw threads 730.

A line L of FIG. 2 is a reference line L connecting outermost sides of the screw threads disposed on the body 700A. The protrusion 720 has a shape protruding further at least from the reference line. In addition, the protrusion 720 is disposed above the screw thread 730. In addition, the protrusion 720 is disposed under a bottom surface 211 of a third groove 210 of the cover 200. Meanwhile, a first groove 230 is provided in the second pocket 200B to correspond to the protrusion 720. The protrusion 720 and the first groove 230 are engaged with each other to increase a coupling force.

Figure 3:
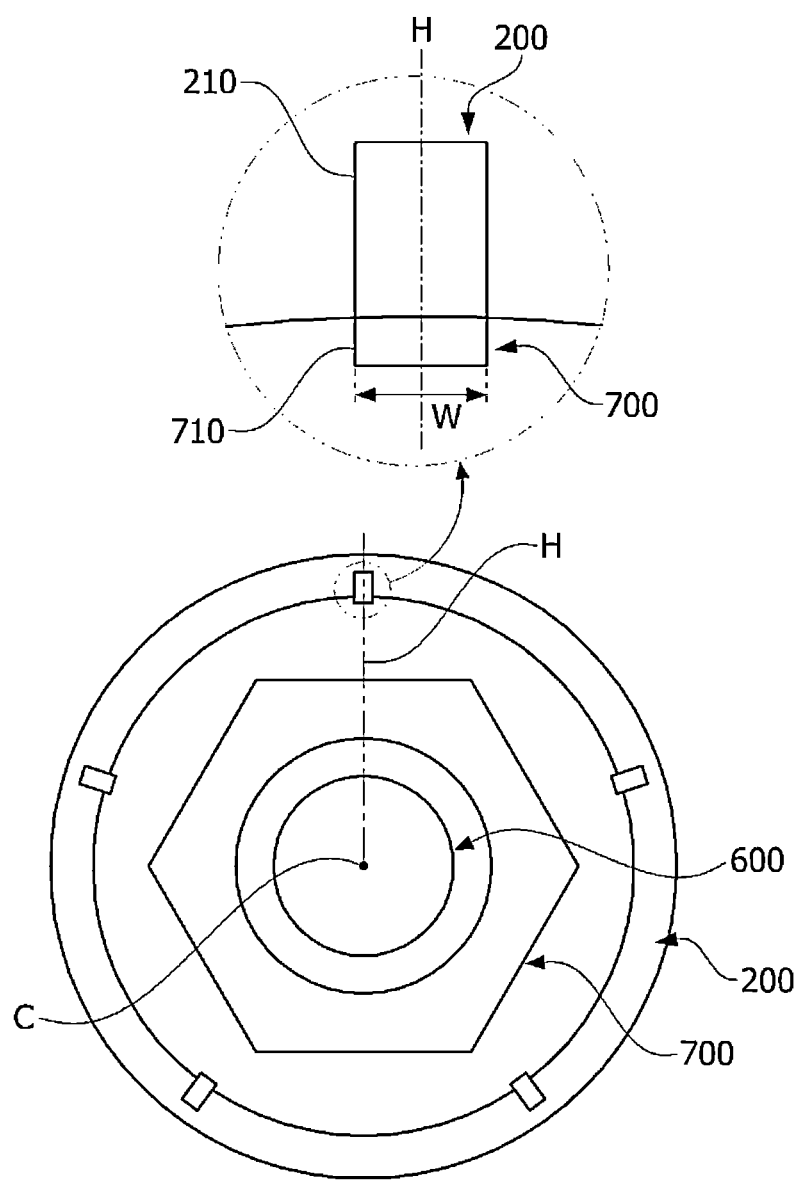
FIG. 3 is a view illustrating a second groove of a nut and a third groove of a cover.

FIG. 3 is a view illustrating a second groove 710 of the nut 700 and the third groove of the cover 200.

Referring to FIGS. 2 and 3, the second groove 710 is disposed in an upper surface of the extension portion 700B of the nut 700. The second groove 710 is concavely disposed around a corner which is a boundary between the upper surface of the extension portion 700B of the nut 700 and an outer side surface of the extension portion 700B. In addition, the third groove 210 is disposed in the upper surface 220 of the cover 200. The third groove 210 is concavely disposed in the upper surface of the cover 200. Specifically, the third groove 210 is concavely disposed around a corner which is a boundary between the upper surface 220 and the second pocket 200B of the cover 200. The second groove 710 and the third groove 210 are connected. In addition, the second groove 710 and the third groove 210 are aligned in a circumferential direction of the cover 200. The second groove 710 and the third groove 210 may be disposed as a plurality of second grooves 710 and a plurality of third grooves 210, respectively. The plurality of second grooves 710 and third grooves 210 may be disposed to be rotationally symmetrical with respect to a center of the cover 200.

A bottom surface 711 of the second groove 710 and the bottom surface 211 of the third groove 210 may be aligned at the same height. In addition, a planar shape formed by the second groove 710 and the third groove 210 may be a rectangular shape. In this case, the planar shape formed by the second groove 710 and the third groove 210 may be symmetrical with respect to a reference line H which is a reference line passing through the center of the cover 200 in the radial direction of the cover 200.

The protrusion 720, the first groove 230, the second groove 710, and the third groove 210, which are described above, are structures of the nut 700 and the cover 200 finally formed through a caulking process for coupling the nut 700 and cover 200. Hereinafter, a process of forming the protrusion 720, the first groove 230, the second groove 710, and the third groove 210 will be described with reference to the accompanying drawings.

Figure 4:
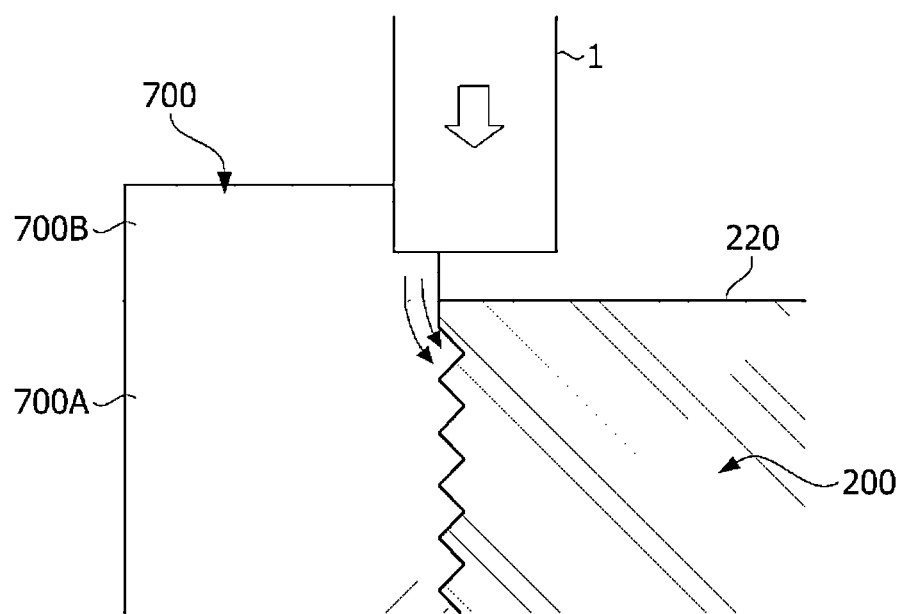
FIGS. 4 to 6 are views for describing a caulking process.
Figure 5:
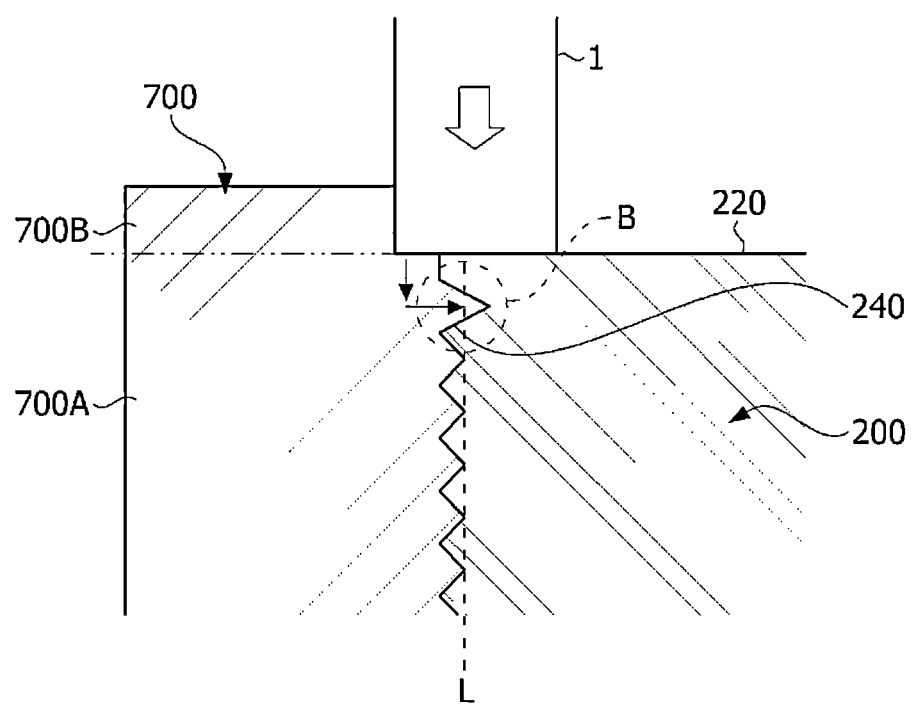
Figure 6:
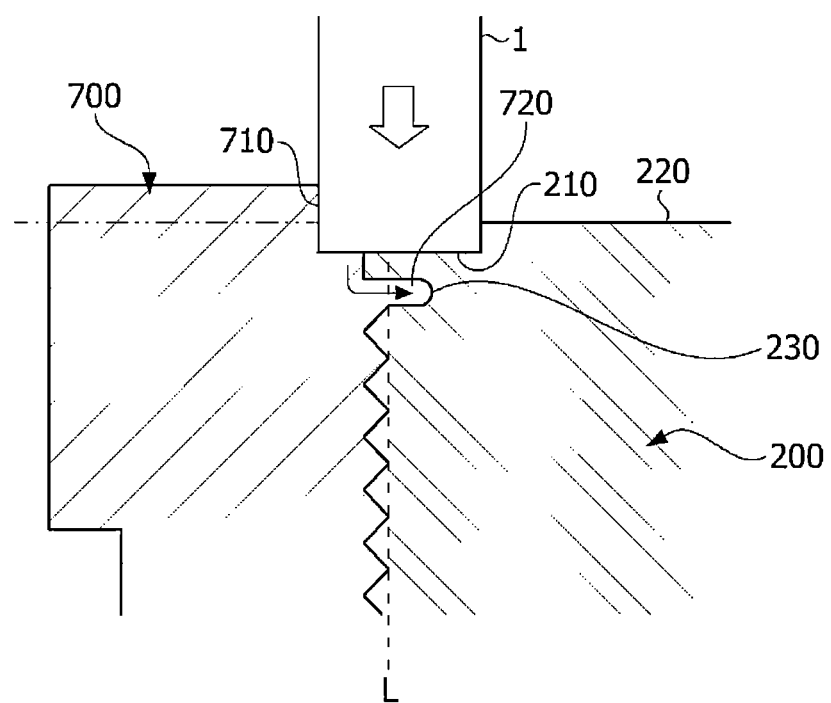

FIGS. 4 to 6 are views for describing the caulking process.

Referring to FIG. 4, first, a jig 1 presses the extension portion 700B of the nut 700 in an axial direction. The jig 1 is disposed on both of the extension portion 700B of the nut 700 and the cover 200 and moves downward. While the extension portion 700B is pressed by the jig 1, an upper side portion of the screw threads of the body 700A of the nut 700 is pressed, deformed, and starts to be pushed toward the screw groove of the cover 200.

Referring to FIG. 5, when the jig continuously presses the extension portion 700B until the extension portion 700B comes into contact with the upper surface of the cover 200, as shown in a region B of FIG. 5, the extension portion 700B is pushed toward the screw groove 240 positioned at an uppermost side of screw threads of the cover 200, and thus the screw thread positioned at an uppermost side of screw threads of the body 700A of the nut 700 is formed in a form protruding further than the other screw thread.

Referring to FIG. 6, when the jig 1 continuously presses the extension portion 700B, the nut 700 and the cover 200 are simultaneously pressed so that the second groove 710 is formed in the extension portion 700B of the nut 700 and the third groove 210 is formed in the cover 200. In addition, the protrusion 720 protrudes further than the screw thread of the body 700A of the nut 700 and is moved inside the cover 200. The first groove 230 is formed in an inner wall of the cover 200. When the jig presses the extension portion 700B, the protrusion 720 is engaged with the first groove 230 to firmly couple the nut 700 and the cover 200.

A deformed portion due to the above-described caulking is not exposed to the outside and is moved and positioned inside the cover 200 so that generation of a foreign material due to the caulking may be inhibited. In addition, since the protrusion 720 and the first groove 230 are firmly engaged in a state in which the nut 700 and the cover 200 are coupled, a coupling force is very large in a direction in which the nut 700 is loosened, and thus there is an advantage of a high loosening torque.

Figure 8:
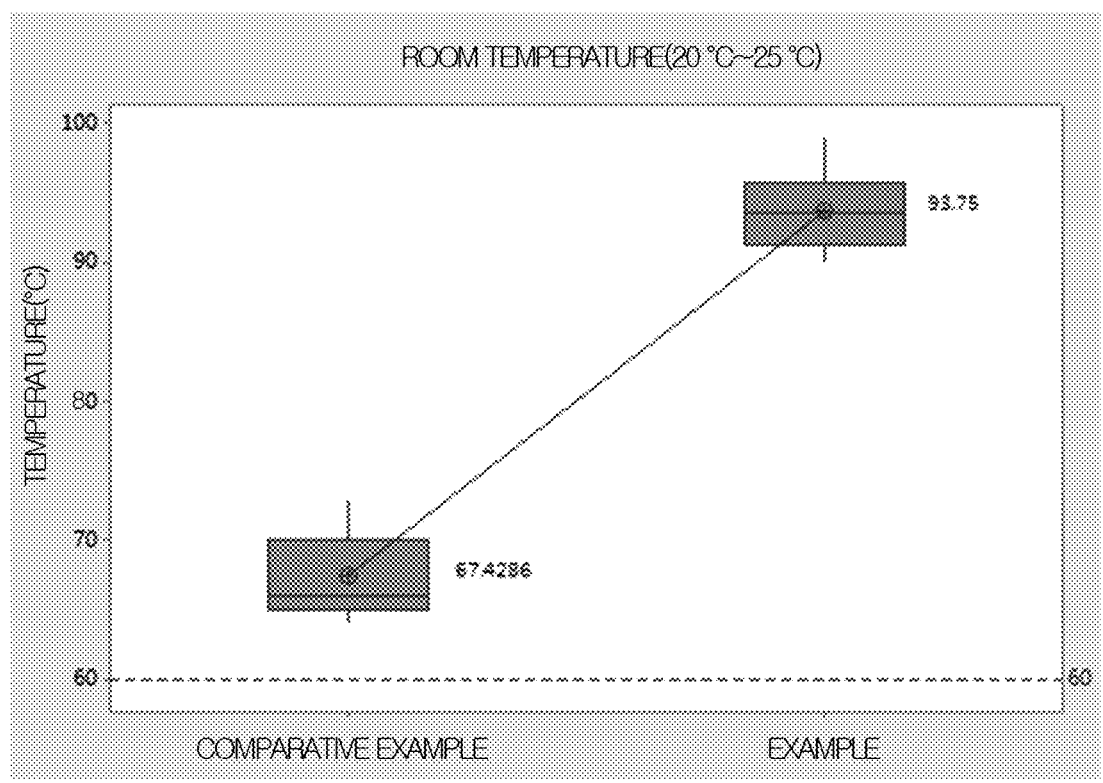
FIG. 8 is a graph showing the comparison between the loosening torque of the comparative example and the loosening torque of the example of the embodiment under a room temperature condition.
Figure 9:
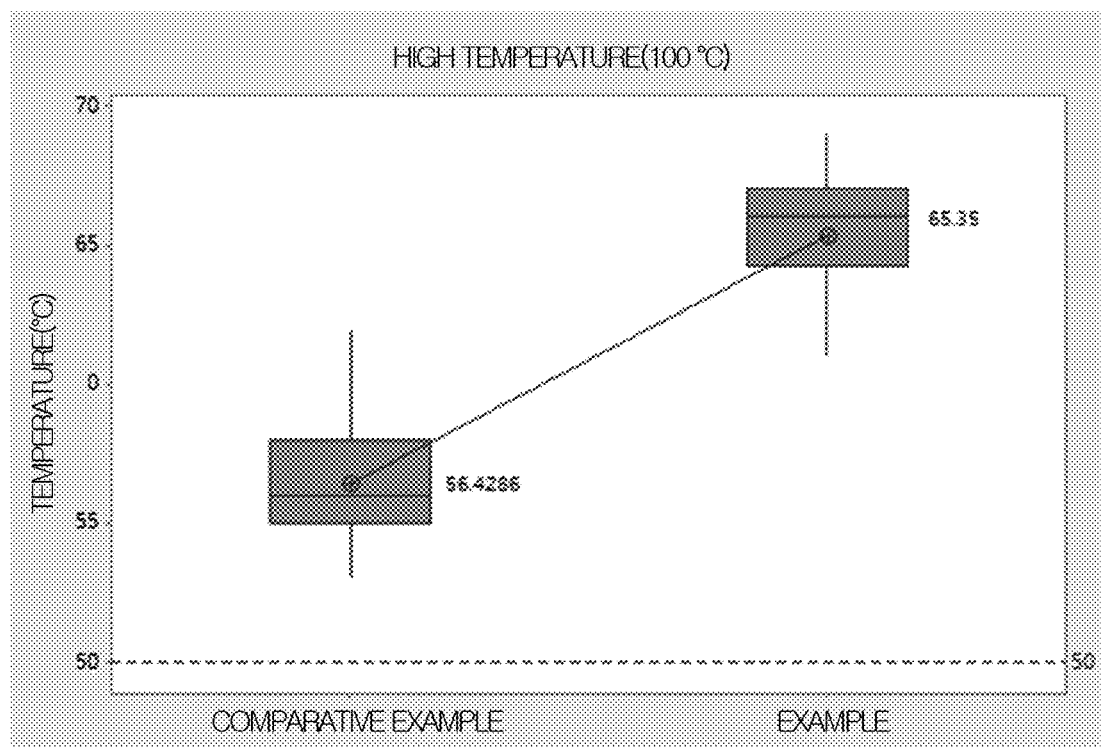
FIG. 9 is a graph showing the comparison between the loosening torque of the comparative example and the loosening torque of the example of the embodiment under a high temperature condition.

FIG. 7 is a table showing the comparison between a loosening torque of a comparative example and a loosening torque of an example of to the embodiment, FIG. 8 is a graph showing the comparison between the loosening torque of the comparative example and the loosening torque of the example of the embodiment under a room temperature condition, and FIG. 9 is a graph showing the comparison between the loosening torque of the comparative example and the loosening torque of the example of the embodiment under a high temperature condition.

In the comparative example, a motor has a structure in which a portion of a cover 200 is caulked, and a portion deformed by the caulking presses an upper surface of a nut 700. Referring to FIGS. 7 to 9, at room temperature (20° C. to 25° C.), it may be seen that a loosening torque of the motor according to the embodiment is much higher than a loosening torque of the comparative example. The high loosening torque corresponds to a high rotation-coupling force of the nut 700 and refers to the nut 700 not easily being loosened from the cover 200. In addition, it may be seen that, even at a high temperature (100° C.), the loosening torque of the motor according to the embodiment is higher than the loosening torque of the comparative example.

Particularly, under room temperature (20° C. to 25° C.) conditions, it may be seen that the loosening torque of the motor according to the embodiment is higher than the loosening torque of the comparative example by 40% or more of the loosening torque of the comparative example.

As described above, the motor according to one exemplary embodiment of the present invention has been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

The invention claimed is:

1. A motor comprising:
a housing;
a cover that covers the housing;
a stator disposed inside the housing;
a rotor disposed inside the stator;
a rotary shaft coupled to the rotor;
a bearing disposed on the cover; and
a nut that is coupled to the cover and that is in contact with an outer ring of the bearing,
wherein the cover incudes a first pocket accommodating the bearing and a second pocket that is disposed above the first pocket and to which the nut is rotation-coupled,
the nut includes a body disposed to be lower than an upper surface of the cover and including a screw thread and an extension portion disposed to be higher than the upper surface of the cover, the body incudes a protrusion protruding outward from the screw thread, and the second pocket includes a first groove in which the protrusion is positioned, wherein the extension portion includes a second groove, wherein the cover includes a third groove connected to the second groove, and wherein the protrusion is disposed under a bottom surface of the third groove.

2. The motor of claim 1, wherein:

the second groove is concavely disposed at a boundary between an upper surface of the extension portion and an outer side surface of the extension portion; and the third groove is concavely disposed in the upper surface of the cover.

3. The motor of claim 2, wherein a bottom surface of the second groove and a bottom surface of the third groove are disposed to be aligned at the same height.

4. The motor of claim 2, wherein a planar shape formed by the second groove and the third groove is symmetrical with respect to a reference line passing through a center of the cover in a radial direction.

5. The motor of claim 1, wherein the third groove is disposed above the screw thread of the body.

6. The motor of claim 2, wherein:

a lower surface and an outer side surface of the outer ring of the bearing are in contact with an inner wall of the first pocket; and a lower surface of the nut is in contact with an upper surface of the outer ring of the bearing.

7. The motor of claim 6, wherein:

the second groove and the third groove are disposed as a plurality of second grooves and a plurality of third grooves, respectively; and the plurality of the second grooves and the third grooves are disposed to be rotationally symmetrical with respect to a center of the cover.

* * * * *